United States Patent [19]

Kurakake

[11] Patent Number: 4,535,277
[45] Date of Patent: Aug. 13, 1985

[54] POSITION CONTROL APPARATUS AND METHOD

[75] Inventor: Mitsuo Kurakake, Hino, Japan

[73] Assignee: Fanuc Ltd., Minamitsuru, Japan

[21] Appl. No.: 484,537

[22] Filed: Apr. 13, 1983

[30] Foreign Application Priority Data

Apr. 16, 1982 [JP] Japan .................. 57-63309

[51] Int. Cl.³ .............................. G05B 13/00
[52] U.S. Cl. .................... 318/561; 318/615; 318/616; 318/660
[58] Field of Search .............. 318/660, 615–618, 318/561

[56] References Cited

U.S. PATENT DOCUMENTS

| 3,015,767 | 1/1962 | Taylor | 318/617 |
| 3,226,649 | 12/1965 | Kelling | 328/71 |
| 4,093,904 | 6/1978 | Burig et al. | 318/616 |
| 4,207,504 | 6/1980 | Kawada et al. | 318/561 |
| 4,311,945 | 1/1982 | Aoyama | 318/615 X |
| 4,338,659 | 7/1982 | Kurakake | 318/561 |
| 4,386,300 | 5/1983 | Ogawa | 318/617 X |

FOREIGN PATENT DOCUMENTS 0034229 2/1980 European Pat. Off. .
3035774 5/1982 Fed. Rep. of Germany .

OTHER PUBLICATIONS

"Fanuc System 9—Model A", Tokyo, Japan, Jan. 12, 1982, published by Fanuc Ltd., Japan.

Primary Examiner—B. Dobeck
Attorney, Agent, or Firm—Staas & Halsey

[57] ABSTRACT

A position control system of closed-loop configuration in which a position detector is provided on a motor-driven machine element for sensing the position thereof and a rotary encoder is provided on the motor shaft for detecting the rotational speed thereof by producing pulses of a frequency proportional to the rotational speed. The system includes a device for controlling position based on a position detection signal from the position detector and a motor position signal from the rotary encoder, and a device for controlling speed based on a rotational speed signal from the rotary encoder and an output from the position control device.

5 Claims, 4 Drawing Figures

POSITION CONTROL APPARATUS AND METHOD

BACKGROUND OF THE INVENTION

This invention relates to a position control apparatus and method, and more particularly to an apparatus and method for sensing and controlling the position of a movable machine element.

Various systems are known in the art for controlling the position of a movable machine element, such as a table or tool of a machine tool. Examples of these conventional systems are illustrated in FIGS. 1 through 3. In FIG. 1, the shaft of a motor MT for driving a movable machine element ME has a rotary encoder (pulse generator) REC attached thereto for generating feedback pulses Pf of a frequency proportional to the rotational speed of the motor. The feedback pulses Pf are applied to a position control circuit PCC which also receives distributed pulses Pi, referred to as command pulses, generated by a pulse distributing circuit PDC in response to an externally applied command. The position control circuit PCC computes the difference between the command pulses Pi and feedback pulses Pf and generates a speed command signal Vc commensurate with the computed difference. The feedback pulses Pf from the rotary encoder also enter a speed detecting circuit VD for producing an actual speed signal Va proportional thereto, the signal Va indicating the actual rotational speed of the motor MT. A speed control circuit VCC supplies the motor MT with a signal commensurate with the difference between the commanded speed and actual speed to drive the motor into rotation, thereby controlling the position of the machine element ME. The apparatus of FIG. 1 thus requires only a single detector, namely the rotary encoder REC, and can be realized with an inexpensive servo system. The arrangement of FIG. 1 is disadvantageous, however, in that only speed control can be performed, making it impossible to achieve accurate positional control.

In the arrangement of FIG. 2, a tachogenerator TCM is specially provided to serve as a speed detector, and a position detector IDS, such as an Inductsyn or optical scale, is employed to detect the position of the movable machine element ME and to produce a signal indicative of the position. With this apparatus, highly accurate and responsive positional control is achieved because the position signal produced by the detector IDS is derived directly from the object being controlled, namely the movable machine element ME. A disadvantage, however, is the comparatively high cost entailed by the use of two detectors, these being the tachogenerator TCM and position detector IDS. Furthermore, although the arrangement provides positional information relating to the movable machine element, no such information is available regarding the motor shaft. Another shortcoming is that a non-linear characteristic of the movable element appears in the position control loop when there is backlash in the mechanical mechanism of the movable element, making it unadvisable to raise the gain of the position control loop.

FIG. 3 illustrates a position control system capable of performing so-called hybrid control, this circuit can be found in Fanuc Ltd.'s System 9—Model A and is shown in detail on p. 23 and described in conjunction therewith in FANUC SYSTEM 9—MODEL A (Supplemental Specification) obtainable from Fanuc, Ltd., Japan. The chief advantage of which is that the gain of the position control loop can be raised when desired. The system includes a tachogenerator TCM for detecting motor speed, a detector such as a resolver RSV for detecting motor position, and a detector IDS such as an Inductsyn or optical scale for detecting the position of the movable element ME of the machine. An arithmetic unit ASU computes the difference PE between a motor position signal MP produced by the resolver RSV and a signal TP, produced by the position detector IDS, indicating the position of the movable element, and feeds a signal indicative of PE through a first-order lag element FDC for addition to a signal CP indicative of a commanded position. A signal CP' resulting from the addition operation is compared with the motor position signal MP, and the difference between the two signals is amplified by an amplifier AF to produce the command speed signal Vc. The speed control circuit VCC produces a signal corresponding to the difference between the commanded speed Vc and the actual motor speed Va, and applies the signal to the motor MT. The motor MT is driven by the signal to transport and, hence, control the movable machine element ME. The foregoing arrangement permits the system gain to be raised and makes it possible to perform highly responsive, accurate positional control. The drawback, however, is a higher cost owing to use of the three detectors TCM, RSV and IDS.

SUMMARY OF THE INVENTION

Accordingly, an object of the present invention is to provide a position control system wherein system gain can be raised and highly responsive, accurate positional control performed through use of a minimum number of detectors.

Another object of the present invention is to provide a position control system wherein both speed and position can be controlled through use of just two detectors.

According to the present invention, the foregoing objects are attained by providing a position control system of closed-loop configuration in which a position detector is provided on a motor-driven machine element for sensing the position thereof and a rotary encoder is provided on the motor shaft for detecting the rotational speed thereof by producing pulses of a frequency proportional to the rotational speed. The system includes means for controlling position based on a position detection signal from the position detector and the total number of pulses from the rotary encoder, and means for controlling speed based on an output from the position control means and the frequency of the pulses from the rotary encoder.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENT

Figure 1:
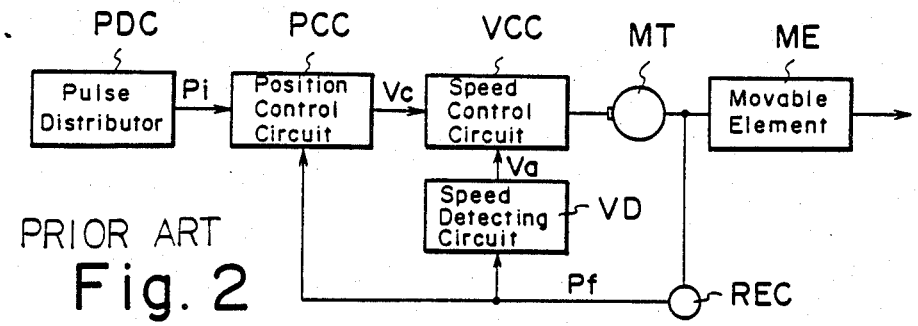
FIGS. 1, 2 and 3 are block diagrams illustrating examples of position control systems according to the prior art.
Figure 2:
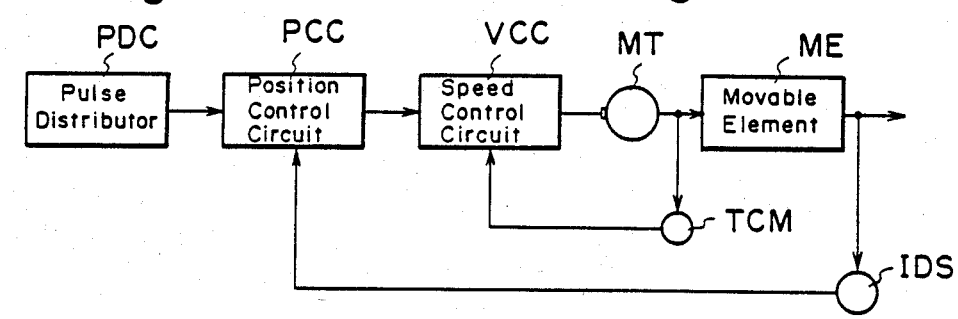
Figure 3:
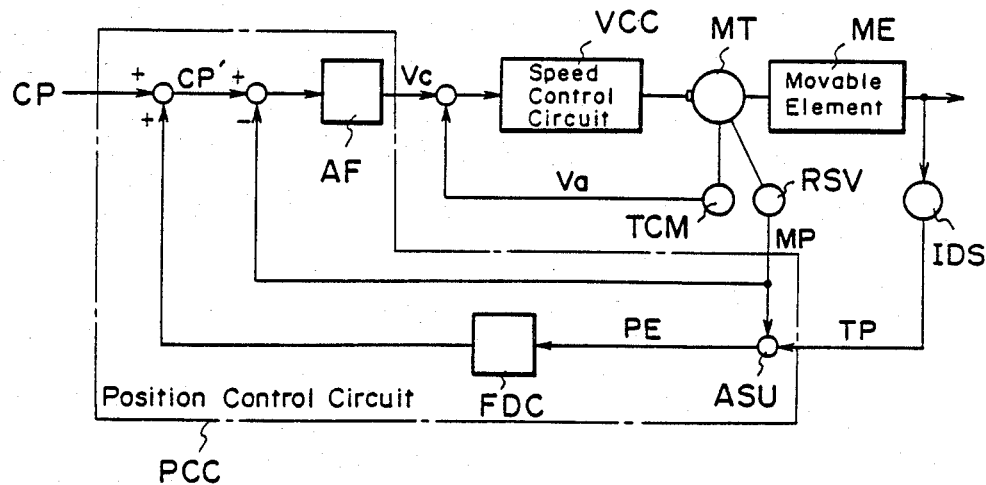
Figure 4:
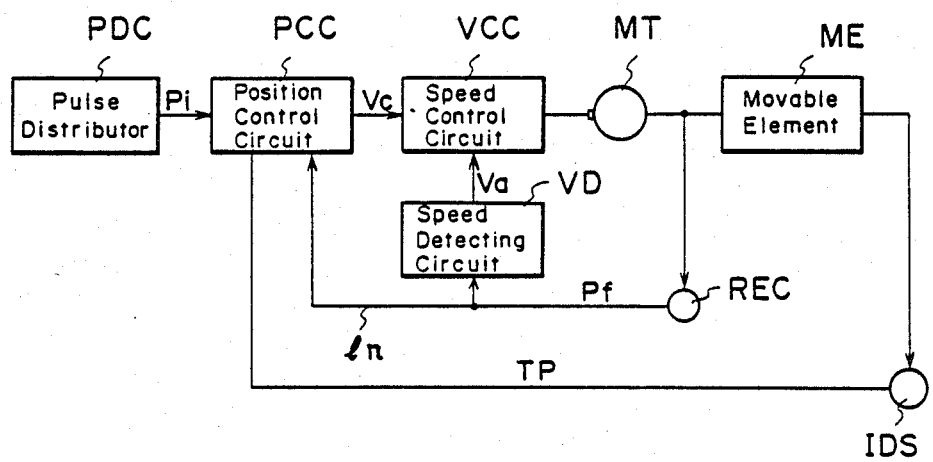
FIG. 4 is a block diagram illustrating a position control system embodying the present invention.

Reference will now be had to the block diagram of FIG. 4 to describe a position control apparatus according to the present invention. The shaft of the motor MT for driving the movable machine element ME has the rotary encoder REC attached thereto for generating the feedback pulses Pf of a frequency proportional to the rotational speed of the motor. The position detector IDS, such as an Inductsyn, is attached to the movable machine element ME to detect the position thereof, and to produce the position signal indicative of the detected position. The rotary encoder REC functions in the same manner as the rotary encoder shown in FIG. 1. The sum of the feedback pulses Pf produced thereby represents the position of the motor shaft, while the frequency of the produced pulses indicates the rotational speed of the motor. The position control circuit PCC has the same construction as the position control circuit depicted in FIG. 3. Accordingly, when performing hybrid control in the manner described earlier in conjunction with FIG. 3, the motor position signal and motor speed signal are generated by using the output of the rotary encoder REC, the motor position signal is applied to the position control circuit PCC and the motor speed signal to the speed control circuit VCC. Positional control can be executed in the manner illustrated in FIG. 2 merely by opening the line indicated at $l_n$ in FIG. 4.

It will be appreciated that the invention accomplishes hybrid control through use of only two detectors, namely the rotary encoder REC and detector IDS, and allows a positional servo loop of the desired type to be constructed.

One application of the present invention would be to use a microprocessor to achieve control digitally in the position and speed control loops. In such case the speed signal would be obtained merely by converting the number of pulses produced by the rotary encoder REC into a digital signal indicative of the rotational speed of the motor MT, thereby eliminating the need for a frequency/voltage converter. By using the rotary encoder to detect the motor position, information relating to both motor position and speed can be obtained, enabling the functions of the two detectors RSV and TCM in FIG. 3 to be realized simultaneously, so that a control system similar to that of FIG. 3 can be achieved at low cost. In a case where the apparatus of the invention is adapted to operate as the arrangement shown in FIG. 2 when motor position information is not required, the rotary encoder detects position optically and thus assures a higher reliability than would be obtained by detecting speed with a tachogenerator. If the rotary encoder is adapted to make use of an optical fiber cable, detection can be carried out over long distances with little noise, providing reliability many times greater than that achieved with a tachogenerator.

As many apparently widely different embodiments of the present invention can be made without departing from the spirit and scope thereof, it is to be understood that the invention is not limited to the specific embodiments thereof except as defined in the appended claims.

What I claim is:

1. A position control apparatus of a closed-loop configuration for controlling the position of a movable machine element driven by a motor having a shaft and receiving position command pulses, comprising:

a position detector provided on the movable machine element for detecting the position thereof, said position detector producing a position signal indicative of the detected position;

a rotary encoder provided on the motor shaft for detecting the rotational speed of the motor, said rotary encoder generating pulses of a number proportional to the detected rotational speed, the total number of said pulses representing the position of the motor and the frequency thereof representing the actual speed of the motor;

position control means, operatively connected to said position detector and said rotary encoder, for producing a control signal based upon the position signal from said position detector and the total number of pulses from said rotary encoder, said position control means comprising:

an arithmetic unit, operatively connected to said rotary encoder and said position detector, for computing a first difference between the position signal and the total number of pulses;

a first order lag circuit operatively connected to receive the first difference;

an adder, operatively connected to said first order lag circuit and to receive the position command pulses, for summing the position command pulses and the first difference; and a first subtractor, operatively connected to said adder and said rotary encoder, for computing a difference between the sum produced by said adder and the total number of pulses, and outputting the difference as the control signal; and speed control means, operatively connected to said position control means, said rotary encoder and the motor, for producing a motor control signal based upon the control signal from said position control means and the frequency of the pulses from said rotary encoder, the motor being driven by said motor control signal to control the position of the movable machine element, said speed control means comprising:

a frequency converter, operatively connected to said rotary encoder, for converting the frequency into an actual speed signal; and a second subtractor, operatively connected to said first subtractor, said frequency converter and the motor, for computing the difference between the control signal and the actual speed signal and producing the motor control signal.

2. A position control apparatus of a closed-loop configuration for controlling the position of a movable machine element driven by a motor having a shaft, comprising:

a position detector provided on the movable machine element for detecting the position thereof, said position detector producing position pulses indicative of the detected position;

a rotary encoder provided on the motor shaft for detecting the rotational speed of the motor, said rotary encoder generating a rotational speed signal composed of feedback pulses of a number proportional to the detected rotational speed;

a pulse distributor for generating distributed pulses in response to an externally applied command;

a position control circuit comprising:

first means, operatively connected to said position detector and said rotary encoder, for computing a first difference between the number of position pulses and the number of feedback pulses;

means, operatively connected to said pulse distributor and said first means, for summing the first difference and the number of distributed pulses;

second means, operatively connected to said means for summing and said rotary encoder, for computing a second difference between the resulting sum and the number of feedback pulses; and means, operatively connected to said second means, for producing a speed command signal commensurate with the second difference; and a speed control circuit, operatively connected to said means for producing the speed control signal, said rotary encoder and the motor, for computing the difference between the speed command signal from said position control circuit and the rotational speed signal from said rotary encoder, and for producing a control signal commensurate with the computed difference, the motor being driven by said control signal to control the position of the movable machine element.

3. A position control method of closed-loop type for positioning a movable element in dependence upon a position command signal, wherein a position detector is provided on a motor-driven movable machine element for producing a first position signal indicative of the position of the movable machine element, and a rotary encoder is provided on the motor shaft for producing a second position signal indicative of the motor shaft position and a speed signal indicative of the actual rotational speed of the motor shaft, said method comprising the steps of:

(a) generating a speed command signal commensurate with an arithmetic difference between the position command signal and the second position signal;

(b) driving the motor based on an arithmetic difference between the speed command signal and the speed signal; and (c) computing an arithmetic difference between the position of the motor shaft and the position of the movable machine element and adding said difference to the position command signal through a first order lag element.

4. A position control apparatus as recited in claim 1, wherein the connection between said rotary encoder and said position control circuit can be opened for performing position control.

5. A position control apparatus as recited in claim 2, wherein the connection between said rotary encoder and said second means can be opened for performing position control.

* * * * *